United States Patent [19]

Stark et al.

[11] Patent Number: 4,620,347

[45] Date of Patent: Nov. 4, 1986

[54] MACHINING CENTER WITH MAGAZINE FOR SPARE TOOLS

[75] Inventors: Gerhard Stark, Beethovenstr. 21, D-7312 Notzingen; Klaus Hoffmann, Bodnegg, both of Fed. Rep. of Germany

[73] Assignee: ·Gerhard Stark, Notzingen, Fed. Rep. of Germany

[21] Appl. No.: 609,872

[22] Filed: May 14, 1984

[30] Foreign Application Priority Data

May 13, 1983 [DE] Fed. Rep. of Germany ....... 3317554

[51] Int. Cl.[4] ............................................. B23Q 3/157
[52] U.S. Cl. ...................................... 29/26 A; 29/568; 408/35
[58] Field of Search .................. 29/26 A, 568; 408/35

[56] References Cited

U.S. PATENT DOCUMENTS

| | | | |
|---|---|---|---|
| 3,414,967 | 12/1968 | Erikson | 29/568 |
| 3,789,473 | 2/1974 | Pagella et al. | 29/568 |
| 4,358,888 | 11/1982 | Zankl et al. | 29/568 |
| 4,419,797 | 12/1983 | Sigloch et al. | 29/26 A |

FOREIGN PATENT DOCUMENTS

2105236   3/1983   United Kingdom .................. 29/568

*Primary Examiner*—Z. R. Bilinsky
*Attorney, Agent, or Firm*—Peter K. Kontler

[57] ABSTRACT

A boring, milling, thread cutting or analogous machine has a frame for a work supporting table and a first carriage which is reciprocable in the X-direction. The first carriage supports an open-and-shut magazine for a supply of spare tools as well as a second carriage which is movable in the Y-direction. The second carriage supports a headstock which is movable with a vertical tool spindle in the Z-direction. The magazine is opened in automatic response to movement of the second carriage in the Y direction and to a predetermined position in which the tool spindle can be relieved of the tool thereon by being lifted upwardly. An indexing mechanism of the magazine then places a selected tool into the path of downward movement of the spindle so that, when the spindle descends, the freshly selected tool is automatically coupled thereto. The second carriage is thereupon moved in the direction of the Y-axis to enable the magazine to become shut. A further selected tool is placed in a position adjacent to the locus of transfer onto the tool spindle while the tool which at such time is attached to the tool spindle is used for the treatment of a workpiece on the table. The device which actually opens the magazine in response to movement of the second carriage in the direction of the Y-axis to a predetermined position is a cam which spreads apart portions of elastically deformable guide rails provided in the magazine and defining an elongated path for the indexing of spare tools therealong.

20 Claims, 4 Drawing Figures

MACHINING CENTER WITH MAGAZINE FOR SPARE TOOLS

BACKGROUND OF THE INVENTION

The present invention relates to machine tools in general, and more particularly to improvements in milling, grinding, boring and similar material removing machines. Still more particularly, the invention relates to improvements in machine tools for removal of material from workpieces which are mounted on a work supporting table or the like in or on the frame or base of the machine, and wherein an upright or otherwise oriented carrier supports a vertical or otherwise inclined work spindle which can receive tools from a magazine on the machine frame.

It is well known to provide a machine tool (also called a machining center) with a magazine for a supply of spare tools and with means for transferring tools between the spindle and the magazine. The presently known and utilized tool magazines normally belong to one of the following four categories:

(1) In accordance with a first prior proposal, the tool magazine is fixedly mounted in or on the frame of the machine at a location which is remote from the tool spindle when the tool on the spindle is ready to treat a workpiece. The spindle is movable in directions toward and away from the magazine so that it can assume a plurality of different positions with respect to the contents of the magazine. In each such position, the spindle can receive from the magazine a different tool or can deliver a tool to a different portion of the magazine. The just described tool storing and transferring system is relatively simple and inexpensive. However, it also exhibits a number of serious drawbacks, especially that replacement of a first tool on the tool spindle with a different second tool takes up a relatively long interval of time. Furthermore, the duration of each interval of tool transfer is different because it depends upon the distance between the normal or operative position of the tool spindle and the location of a selected tool in the interior of the stationary magazine. This is due to the fact that each and every tool is allotted a predetermined position in the interior of the magazine and that the latter does not have any means for transferring tools in its interior to a position at a minimum distance from the tool spindle when the spindle is held in the operative position. Nevertheless, such magazines continue to be in use because they can be installed at a considerable distance from the operative position of the tool spindle so that the interior of the magazine and the tools therein cannot be contaminated by chips, shavings and/or other particles which are removed from the workpiece when the tool on the spindle is in actual use.

(2) In accordance with a second prior proposal, the tool magazine is indexible so that it can place a selected tool to a predetermined position in which such tool can be transferred onto the tool spindle and the magazine can receive the previously utilized tool from the spindle. As a rule, the transfer of tools takes place in such a way that the spindle is advanced toward the magazine, the tool is transferred from the spindle into the magazine, and the magazine is thereupon indexed to move a selected tool into proper position for transfer onto the spindle. This entails relatively long periods of dwell of the spindle at a considerable distance from the operative position with attendant long interruptions of treatment of workpieces. The periods of dwell vary from transfer to transfer because their duration depends upon the extent to which the magazine must be indexed after it has received a previously used tool from the spindle.

(3) In accordance with a third conventional proposal, the magazine which stores a supply of spare tools is indexible in a machine tool wherein the work spindle is movable in a single direction, namely in the direction of the Z-axis which makes an angle of 90 degrees with the general plane of the magazine and is normally vertical. The magazine can index a selected tool into the path of movement of the spindle in the direction of the Z-axis. When a selected tool is located in the path of movement of the spindle, the latter is advanced from a retracted position to a coupling position, in which it is connected with the selected tool, and thereupon to an operative position in which it can treat a workpiece. This means that the interval which is required for the attachment of a fresh tool to the spindle is reduced considerably because the spindle can proceed from the tool-receiving position to the operative position without any delay as soon as a selected tool is properly positioned with reference to the path of movement of the spindle along the Z-axis. The transfer of a previously used tool back into the magazine takes place by reversing the direction of movement of the spindle so that the latter is moved from the operative position to the tool transferring position in which the previously used tool is detached therefrom, and the spindle is thereupon advanced to the retracted position so as to allow for renewed indexing of the magazine in order to place a different tool into the path of movement of the spindle toward its operative position.

The just described system exhibits a serious drawback, namely that the magazine is closely adjacent to the station where the tool on the spindle treats the workpieces. This brings about the danger of contaminating the tools in the interior of the magazine by chips, shavings and/or other particles which are being removed from a workpiece. Furthermore, if the tool which has been coupled to the spindle was located between a pair of relatively large spare tools in the interior of the magazine, such spare tools are likely to interfere with movements of a workpiece to a desired number of different positions for proper treatment by the tool which is then mounted on and is rotated or otherwise moved by the spindle. An additional drawback of the just described system is that the efficiency of tool transfer between the spindle and the magazine depends considerably on the distribution of spare tools in the interior of the magazine and on the sequence in which the tools are to be connected with the spindle. In other words, the transfer can be effected rapidly and efficiently only if the tool which is about to be attached to the spindle is not remote from the position to which such tool must be indexed with the magazine in order to be located in the path of movement of the tool spindle from its retracted to its operative position.

(4) In accordance with a fourth proposal, the tool magazine is indexible about a fixed axis and is installed in the machine frame at a location which is remote from the operative position of the tool spindle. The magazine can be indexed by a suitable stepping motor or the like so as to move a selected tool to a predetermined position with reference to the tool spindle. Such machine further comprises a so-called manipulator with two pairs of grippers or jaws. The manipulator is installed in the space between the tool spindle and the locus of the selected position of a tool which is about to be transferred onto the spindle. One pair of jaws which form part of the manipulator can receive and hold a tool which has been removed from the spindle, and another pair of jaws on the same manipulator can grip the tool which is about to be attached to the spindle. Once the manipulator supports two discrete tools, it is indexed (normally through an angle of 180°) so as to place the tool which has been removed from the magazine into proper position for application to the tool spindle and to place the tool which has been removed from the spindle into proper position for insertion or introduction into the magazine.

The just described system exhibits the important advantage that the interval which is required for the transfer of tools between the magazine and the tool spindle is reduced considerably because the indexing of the magazine in order to place the tool, which is about to be transferred onto the spindle, into an optimum position for such transfer can take place while a tool is still attached to the spindle and is in actual use. An additional advantage of such system is that the magazine and the tools therein are remote from the location where the tool on the spindle treats the workpieces so that the tools which are stored in the magazine are not likely to be contaminated by cutting liquid, grease and/or particles of material which is being removed from the workpieces. In addition, the tools which are stored in the magazine cannot interfere with movements of the workpiece to any desired number of different positions relative to the tool which is then attached to the spindle. However, such system also exhibits a serious drawback, especially as concerns its complexity and initial and maintenance cost. This will be readily appreciated by bearing in mind that the manipulator must be equipped with at least three electromechanical, hydraulic, pneumatic or other drives in order to enable the manipulator and its jaws to perform a requisite number of different movements, namely the jaws must be capable of performing a movement between open and closed positions in which they respectively release and engage a tool, the manipulator must be capable of performing a second movement which enables a pair of jaws to attach a tool to or to remove a tool from the spindle, and the manipulator must be capable of performing a third movement (normally an indexing movement through 180°) in order to move one pair of jaws from a position in close proximity to the spindle to a position close to the magazine while the other pair of jaws moves from a position close to the magazine to a position closer to the spindle.

OBJECTS AND SUMMARY OF THE INVENTION

An object of the invention is to provide a novel and improved system for storing spare tools in a magazine and for transferring tools between the magazine and the tool spindle of a machining center.

Another object of the invention is to provide a machine which embodies the above outlined tool storing and transferring system.

A further object of the invention is to provide a novel and improved tool magazine for use in the machine of the above outlined character.

Still another object of the invention is to provide a relatively simple, compact and inexpensive tool storing and transferring system which can be installed in existing machines without necessitating substantial alterations of such machines.

Another object of the invention is to provide a tool storing and transferring system wherein the magazine can be held at a substantial distance from the tool spindle when the latter assumes its operative position but such remoteness of the magazine from the tool spindle does not contribute to longer periods of transfer of tools between the spindle and the magazine.

A further object of the invention is to provide a machine wherein the entire magazine need not be indexed in order to place a selected tool into proper position for transfer onto the spindle.

Still another object of the invention is to provide a novel and improved method of preparing a tool magazine for reception of a previously used tool and for dispensal of a fresh tool which is about to be attached to a spindle or another tool supporting device.

Still another object of the invention is to provide a tool magazine which is automatically caused to assume a proper position for reception or dispensal of tools when the need for the transfer of a fresh tool onto the tool spindle arises.

The invention is embodied in a machine or machining center for removal of material from workpieces by any one of a plurality of tools. The machine comprises a frame, a supporting device which is mounted on the frame, a tool spindle which is mounted in the supporting device, an open-and-shut tool storing device which is mounted in or on the frame and is openable to allow for transfer of tools between the spindle and such storing device on movement of at least one of the two devices to a predetermined position with reference to the other of the two devices, and means for moving the one device to and from such predetermined position. The machine preferably further comprises means for effecting a relative movement between the spindle and the supporting device to thereby effect actual transfer of tools between the spindle and the storing device.

In accordance with a presently preferred embodiment of the invention, the one device is the supporting device. Such machine preferably further comprises means for opening the storing device in response to movement of the supporting device toward the predetermined position. Such opening means is preferably connected with and shares the movements of the supporting device with reference to the storing device. For example, the opening means can comprise cam means which is reciprocable by the supporting device in first and second directions and follower means which is engageable by the cam means while the cam means moves in one of the first and second directions to thereby open the storing device. The spindle is preferably movable with reference to the supporting device in a direction (Z-axis) at right angles to the direction of reciprocatory movement of the cam means.

The storing device can comprise guide means defining an elongated path (for example, an endless oval path) for a supply of tools and means for advancing the tools of such supply along the elongated path. The guide means includes portions which are adjacent to or actually abut against each other in the shut position of the storing device and which are spaced apart from one another in the open position of the storing device to thus provide a passage for the transfer of tools between the path and the spindle. It will be appreciated that the path is or need or can be endless only in the shut position of the storing device. At least a part of the guide means can consist of an elastomeric material and such part tends to move the aforementioned portions of the guide means toward each other so as to reduce the width of the passage. In accordance with a presently preferred embodiment of the invention, the guide means comprises spaced parallel first and second guide rails each of which has a first and a second end portion and such end portions of each guide rail are closely adjacent to each other in the shut position of the storing device but are spaced apart to establish the aforementioned passage in the open position of the storing device. In such machines, the supporting device preferably carries or includes first and second auxiliary rails which enter between the end portions of the respective (first and second) guide rails in the predetermined position of the one device. The supporting device can comprise a headstock for the tool spindle and such headstock is or can be provided with an extension which carries or is made integral with the auxiliary rails. Such machine further comprises means for moving the headstock relative to the storing device so as to move the auxiliary rails into or from the passage. The headstock is movable along a vertical path (Z-axis), and the elongated path which is defined by the guide means is preferably disposed in a horizontal plane. The spindle is in a position to receive a tool from the elongated path or to allow for transfer of a tool therefrom into the elongated path only when the auxiliary rails are disposed between the aforementioned end portions of the respective guide rails.

For example, the improved machine can comprise a first carriage for moving the supporting device relative to the frame in a first direction, a second carriage which is provided on the first carriage and serves to move the supporting device in a second direction at right angles to the first direction, and means for moving the spindle relative to the supporting device in a third direction at right angles to the first and second directions. The magazine can be fixedly secured to the first carriage.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
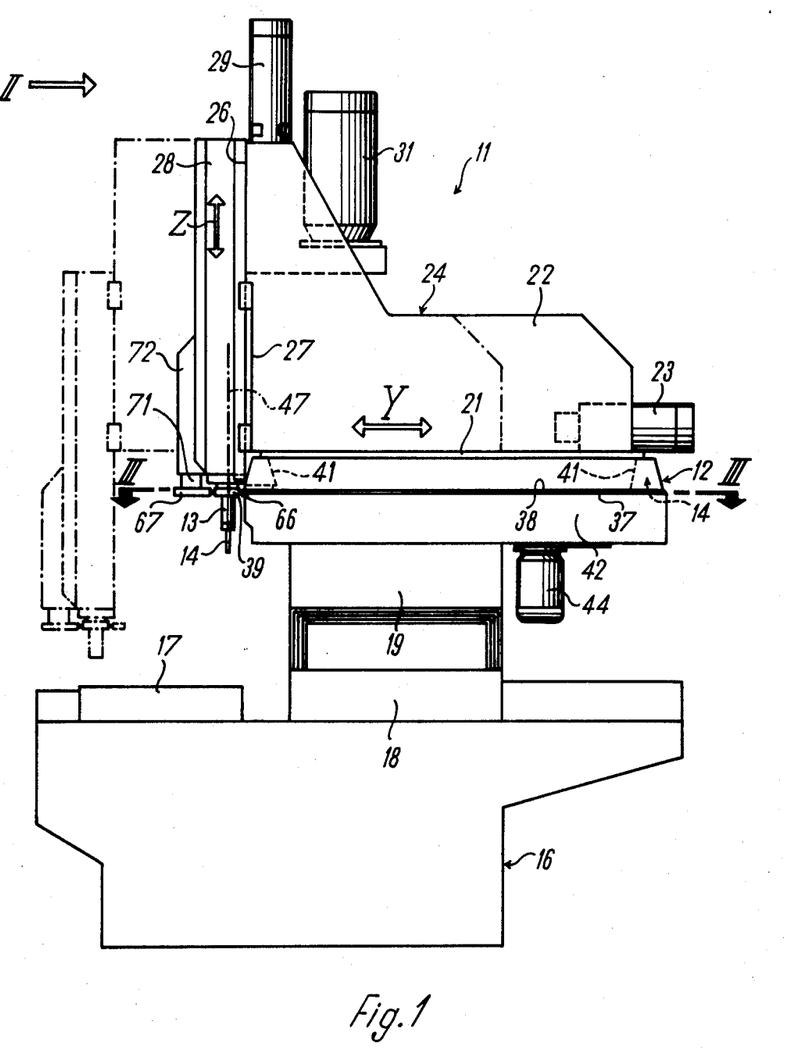
FIG. 1 is a schematic side elevational view of a machine which embodies one form of the invention, the supporting device for the tool spindle being shown in a first position by phantom lines and in a different second position by solid lines, the transfer of tools between the spindle and the tool storing device taking place when the supporting device is held in or close to the second position.
Figure 2:
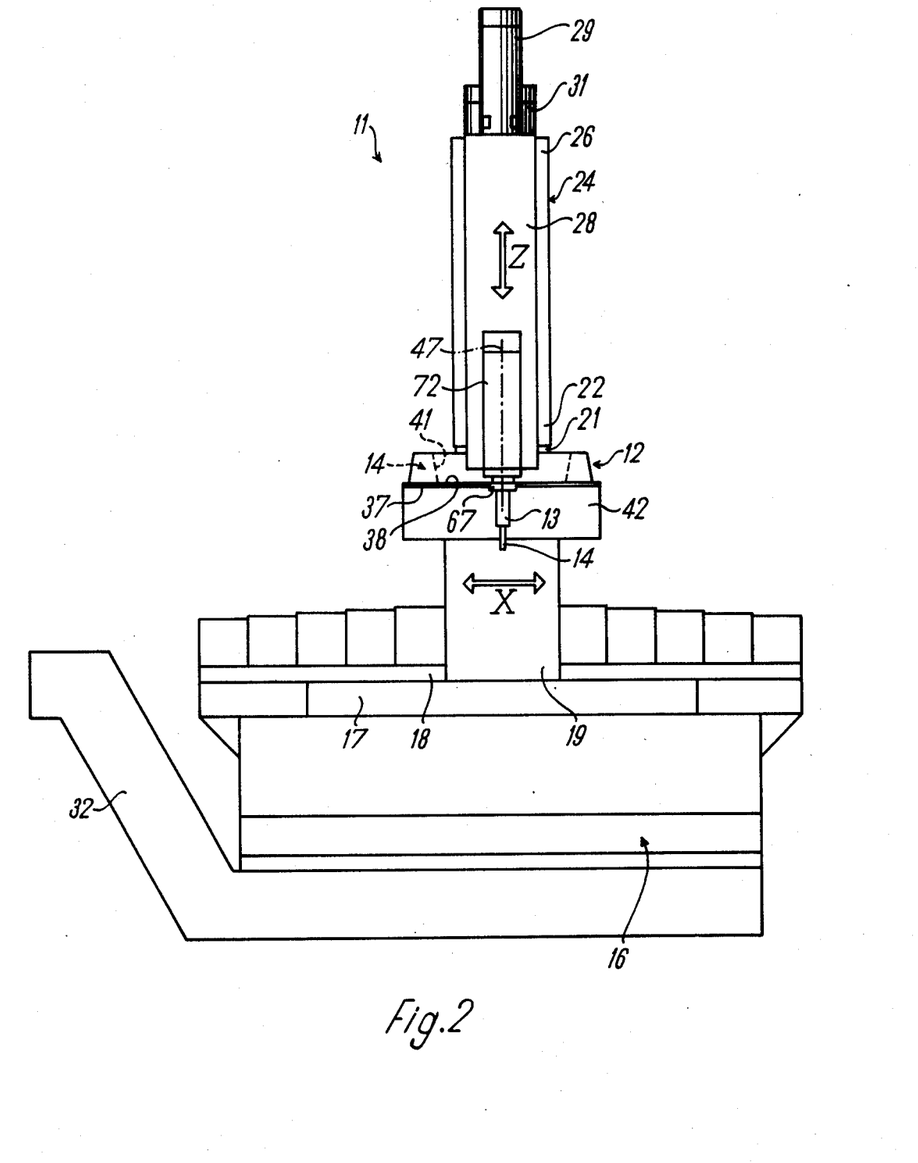
FIG. 2 is an end elevational view of the machine as seen in the direction of arrow II in FIG. 1.

Referring first to FIGS. 1 and 2, there is shown a machine or machining center 11 which serves to remove material from workpieces mounted on a stationary or movable work supporting table 17 which is mounted on a stationary frame or base 16. The machine 11 can constitute a boring, thread cutting, milling or similar machine tool. The frame 16 further supports a tool storing device 12 (hereinafter called magazine) which is constructed, mounted and assembled in such a way that the aforediscussed manipulator of the conventional tool storing and transferring system can be omitted. The transfer of tools 14 takes place between the magazine 12 and a vertical tool spindle 13 which is rotatably mounted in a headstock 28 secured to and movable relative to a supporting device 24 shown in the form of an upright column including a carriage 22 which is movable relative to the magazine 12 in the directions indicated by double-headed arrow Y. The directions of vertical reciprocatory movement of the headstock 28 and tool spindle 13 relative to the supporting device 24 are indicated by a double-headed arrow Z. The magazine 12 is constructed and assembled in such a way that a selected tool 14 therein can be moved to proper position for rapid transfer onto the spindle 13 while the spindle carries a tool 14 and treats a workpiece on the table 17. This ensures that the interval of time which is required for the transfer of a previously used tool 14 from the spindle 13 into the magazine 12 and for subsequent transfer of a fresh tool 14 from the magazine 12 onto the spindle 13 is surprisingly short.

The manner in which a workpiece can be clamped or otherwise removably secured to the table 17 is conventional and, therefore, it is not specifically shown in the drawing. The drawing further does not show any means for moving the table 17 relative to the frame 16 even though such moving means are or can be provided in the machine 11, if necessary. The attendant in charge of the machine 11 is or can be stationed adjacent to the left-hand side of the frame 16, as viewed in FIG. 1. With reference to FIG. 1, the table 17 is located to the left of a first guide means or ways 18 defining a horizontal path for a first carriage 19 which is movable in directions indicated in FIG. 2 by a double-headed arrow X. The carriage 19 supports the tool magazine 12 as well as a guide means or ways 21 defining a horizontal path for the second carriage 22 which, as mentioned above, can constitute a component part of the supporting device 24 for the headstock 28. The directions which are indicated by the arrow Y are normal to those indicated by the arrow X, and the directions which are indicated by the arrow Z are normal to those indicated by the arrows X and Y. If the table 17 is reciprocable relative to the frame 16, it can be mounted in guide means or ways which extend in parallelism with the horizontal ways 18 for the first carriage 19. However, the table 17 can also be caused to perform additional movements relative to the frame 16, depending on the nature of treatment to which a workpiece on such table must be subjected by the tool 14 which is attached to the lower end portion of the spindle 13. As mentioned above, the solid-lines denote in FIG. 1 that position of the supporting device 24 in which the spindle 13 is closely or immediately adjacent to the magazine 12 to facilitate rapid transfer of tools 14 between such spindle and the interior of the magazine. The phantom lines denote in FIG. 1 one of the operative positions of the supporting device 24 and of the headstock 28 thereon relative to the workpiece on the table 17. The means for reciprocating the first carriage 19 along the ways 18 is normally installed in the interior of the frame 16 and is not specifically shown in the drawing. The reference character 23 denotes an electric motor or another suitable prime mover which can move the supporting device 24 and its carriage 22 along the ways 21 in the directions indicated by the double-headed arrow Y.

The left-hand side face 26 of the supporting device 24 is provided with vertical guide means or ways 27 for the headstock 28 and spindle 13. The means for rotating the spindle 13 relative to the headstock 28 comprises a main prime mover 31 which can constitute an electric motor. A further motor 29 is provided to move the headstock 28 and the tool spindle 13 along the vertical ways 27 in the directions which are indicated by the double-headed arrow Z. The main prime mover 31 is or can be mounted on the supporting device 24.

If desired, the work supporting table 17 can be indexed on the frame 16 about a vertical axis through angles of 180° so that a workpiece at one end or on one-half of the table can be treated by the tool 14 which is attached to the spindle 13 while the other end portion or half of the table is available for detachment of a finished workpiece and subsequent attachment of a fresh workpiece or blank.

It is further clear that the orientation of the headstock 28 and tool spindle 13 with reference to the supporting device 24 can be changed, for example, so that the axis 47 of the spindle 13 is horizontal rather than vertical. Moreover, one of the carriages 19, 22 can be omitted if the table 17 is mounted for movement in the directions indicated by the double-headed arrow X or Y. In the illustrated embodiment, those movements of the headstock 28 and spindle 13 which are indicated by the arrow Z are necessary in order to effect the transfer of tools 14 between the spindle 13 and the magazine 12; therefore, the motor 29 and the ways 27 must be provided even if the table 17 is movable in the directions which are indicated by the arrow X or Y.

FIG. 2 shows a conveyor 32 which serves to remove chips, shavings and/or other particulate or liquid substances and materials from the work treating station. The exact construction of such conveyor and of the means for directing particulate material and/or droplets of cutting or other liquid into its intake forms no part of the present invention.

As mentioned above, the magazine 12 is fixedly secured to the first carriage 19 at a level below the ways 21 for the supporting device 24 and its carriage 22. The illustrated magazine 12 is substantially flat and is disposed in a horizontal plane, i.e., in a plane which is normal to the directions of movement of the tool spindle 13 relative to the supporting device 24. Thus, the spindle 13 can be moved with reference to the magazine 12 in the directions which are indicated by the double-headed arrow Y as well as in directions which are indicated by the double-headed arrow Z.

Figure 3:
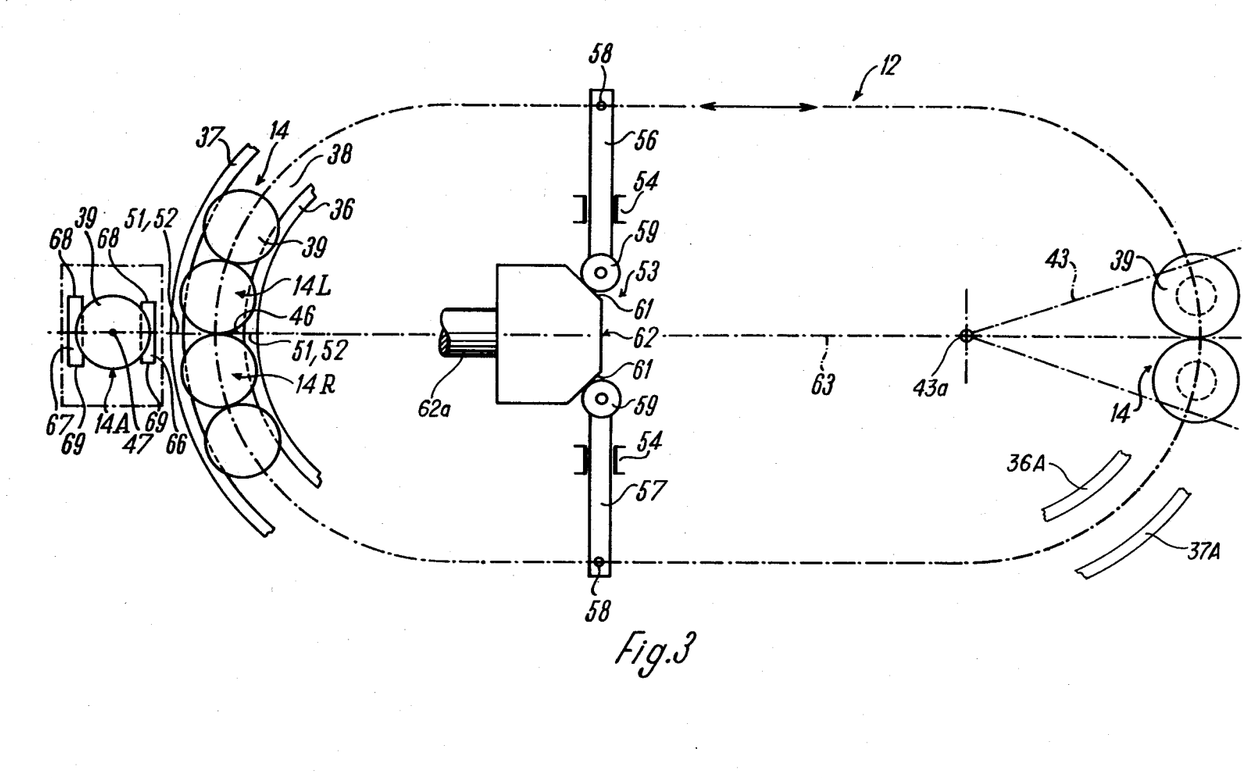
FIG. 3 is an enlarged partly diagrammatic plan view of the tool storing device and of the means for opening the storing device in response to movement of the supporting device to the solid-line position of FIG. 1, the opening means for the storing device being shown in idle position and the view of FIG. 3 being taken substantially in the direction of arrows as seen from the line III—III of FIG. 1.
Figure 4:
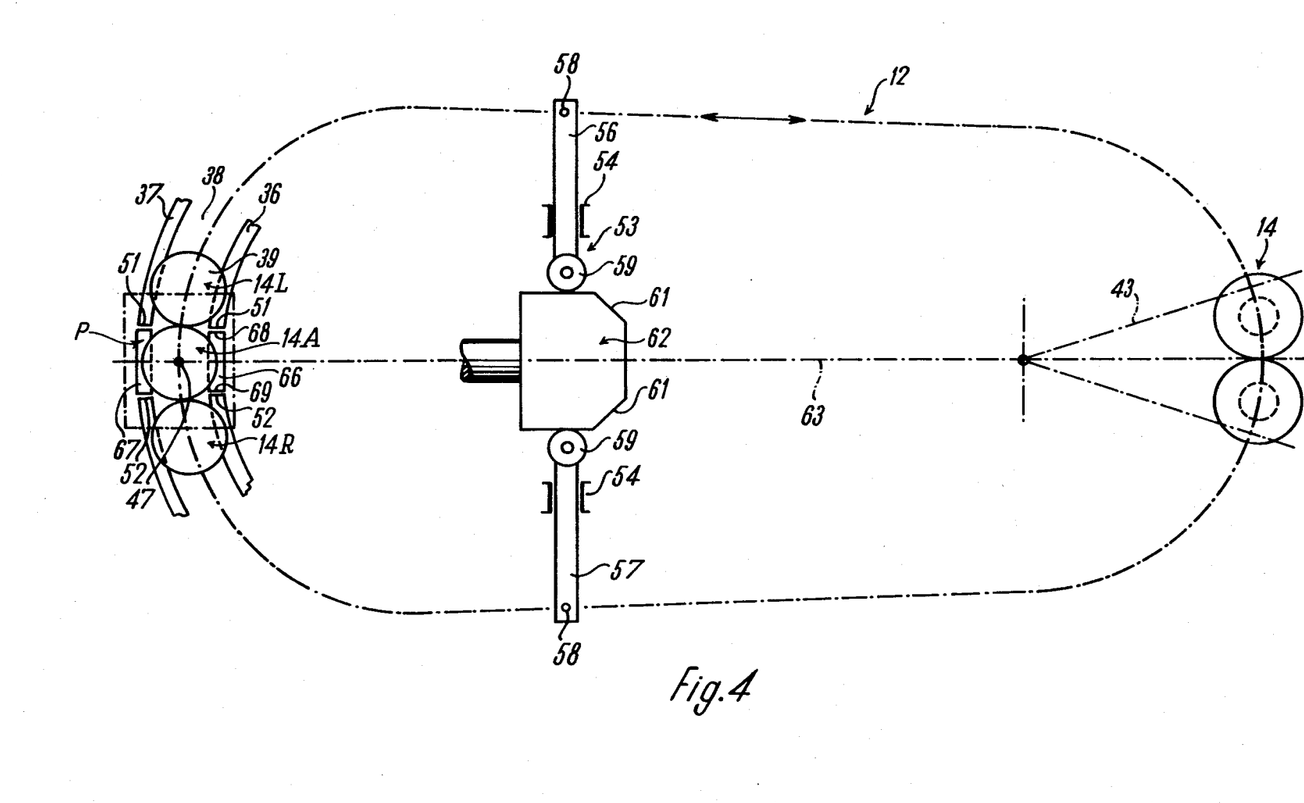
FIG. 4 illustrates the structure of FIG. 3 but with the opening means in the operative position and with the tool spindle in a position for the transfer of tools between its lower end portion and the elongated path which is defined by the guide means of the storing device.

As can be seen in FIGS. 3 and 4, the magazine 12 comprises two elongated parallel partially arcuate and partially straight guide rails 36 and 37 defining an elongated path 38 which is disposed in a horizontal plane and serves to accommodate a supply of preferably immediately adjacent spare tools 14. When the magazine 12 is shut (see FIG. 3), the path 38 is an elongated endless oval path with a rounded portion facing the tool spindle 13. The illustrated oval shape is but one of many shapes which the guide rails 36 and 37 can impart to the path 38. The exact dimensions and configuration of the path 38 will depend on the availability of space for the magazine 12 on the carriage 19 as well as on the dimensions of the tools 14 which must be stored therein. Furthermore, the dimensions and configuration of the magazine 12 will depend on the number of tools which are to be stored in the path 38. The reference characters 39 denote in FIGS. 3 and 4 adapters which are connected with the tools 14 and serve to properly support such tools on the guide rails 36, 37 while the tools are either stationary or are indexed by steps of preselected length so as to move along the path 38, either in a clockwise or in a counterclockwise direction, as viewed in FIGS. 3 or 4. The means for moving or indexing the adapters 39 for the tools 14 comprises a sprocket wheel 43 which is shown schematically in the right-hand portion of each of FIGS. 3 and 4 and is indexible about a vertical axis 43a so as to move the adjacent adapters 39 through angles of predetermined magnitude. The adapter or adapters 39 which are actually engaged by the teeth (not specifically shown) of the sprocket wheel 43 push the adapters which are disposed ahead of the respective tools, as considered in the direction of rotation of the sprocket wheel 43, so that the entire supply of tools 14 in the magazine 12 can be shifted along the path 38 when the magazine 12 is shut (as shown in FIG. 3) but also when the magazine is open (as shown in FIG. 4).

FIG. 1 merely shows the conical mounting or coupling portions 41 of two tools 14 in the magazine 12, namely of a tool 14 which is remotest from the spindle 13 and of a tool which is immediately or closely adjacent to such spindle. The manner in which the conical portions 41 can be used to secure a tool to the spindle 13 is known and need not be described here. The mounting of tools 14 in the magazine 12 is such that their cutting edges, blades, threads, tips and/or other material removing or treating portions face downwardly.

FIGS. 1 and 2 further show that the outer guide rail 37 of the magazine 12 is provided with a downwardly extending protecting shroud or skirt 42 which shields the supply of stored tools 14 from particles of material which is removed from the workpiece on the table 17. Such shroud further protects the supply of stored tools from dust or other foreign matter which is contained in the surrounding atmosphere. The carriage 19 supports an electric motor 44, preferably a reversible stepping motor, for the sprocket wheel 43. The manner in which such motor can rotate the sprocket wheel 43 in stepwise fashion, either clockwise or counterclockwise, is known in the art and, therefore, need not be described here. As can be readily seen in each of FIGS. 1, 3 and 4, the sprocket wheel 43 is disposed in and is adjacent to that portion of the magazine 12 which is remotest from the tool spindle 13.

The axis 47 of the tool spindle 13 intersects the leftmost portion of the path 38, as viewed in FIGS. 3 or 4, when the tool spindle 13 is ready to receive a fresh tool 14 or to be relieved of a tool which is about to be introduced into the magazine 12. For this purpose, the end portions 51 and 52 of each of the two guide rails 36, 37 are moved apart from the positions of FIG. 3, in which they either abut against or are immediately or closely adjacent to each other, to the positions which are shown in FIG. 4 and in which such end portions define a passage P. The magazine 12 is then open and is held in such open position as long as the axis 47 of the tool spindle 13 assumes the position which is shown in FIG. 4. In each other position of the supporting device 24 with reference to the ways 21, the magazine 12 is shut in a manner as shown in FIG. 3. For this purpose, each of the guide rails 36, 37 comprises an elastomeric portion 36A, 37A (see FIG. 3) which stores energy when the end portions 51, 52 of the respective guide rail are moved apart to the positions of FIG. 4 and which tends to close the respective guide rail by moving the corresponding end portions 51, 52 toward or into actual abutment with each other. In FIG. 3, the end portions 51, 52 of each of the two guide rails 36, 37 actually abut against each other in a vertical plane 46 which includes the axis 47 of the tool spindle 13.

The width of the passage P between the end portions 51, 52 of each of the guide rails 36, 37 in the open position of the magazine 12 may but need not be sufficient to provide room for the transfer of a tool 14 from the path 38 in a direction to the left, as viewed in FIG. 4 or in the opposite direction.

The mechanism for opening or spreading the guide rails 36, 37 of the magazine 12 is shown at 53. Such opening mechanism comprises a reciprocable cam 62 having two suitably inclined cam faces 61 and being reciprocable along a horizontal path. The opening mechanism 53 further comprises two roller followers 59 which are respectively mounted at the inner ends of two elongated bars or rods 56, 57. Such bars are reciprocable in stationary bearings 54 and their outer end portions are articulately connected to the inner and/or outer guide rail 36, 37 by joints 58. When the cam 62 is located in the retracted or inoperative position of FIG. 3, its faces 61 abut against the corresponding followers 59 but the elastically deformable portions 36A, 37A of the guide rails 36, 37 are not caused to store extra energy so that they can maintain the respective end portions 51, 52 close to or in actual abutment with one another. However, when the cam 62 is shifted along the path 63 in a direction to the right, as viewed in FIG. 3, so as to assume the position of FIG. 4, the roller followers 59 are moved away from each other and the corresponding bars 56, 57 cause the elastically deformable parts 36A, 37A of the guide rails 36, 37 to store energy whereby the end portions 51, 52 of such guide rails establish the aforementioned passage P. It will be noted that the joints 58 are provided between the respective bars 56, 57 and elongated straight portions of the guide rails 36 and/or 37.

In the illustrated embodiment, the cam 62 comprises two mirror symmetrical portions each of which carries one of the cam faces 61. The symmetry plane is the plane 46. However, it is equally within the purview of the invention to provide a non-symmetrical cam 62 which can shift one of the bars 56, 57 to a greater extent than the other bar. This depends on the desired location of the passage P when the magazine 12 assumes its open position.

In accordance with a presently preferred embodiment of the invention, the shaft 62a of the cam 62 is connected (either directly or indirectly) to the supporting device 24 so that it shares the movements of the carriage 22, headstock 28 and spindle 13 in directions which are indicated by the arrow Y. When the carriage 22 is caused to move in a direction to the right, as viewed in FIG. 1, to move the axis 47 of the spindle 13 to the position which is shown in FIG. 4, the cam 62 assumes its operative position and the end portions 51, 52 of both guide rails 36, 37 establish the passage P. When the magazine 12 is open, two tools 14L and 14R in the then open elongated path 38 flank the passage P and provide sufficient room for insertion of a further tool 14A, namely the tool which is about to be separated from the spindle 13 before the spindle can receive one of the tools 14L, 14R.

In accordance with a further feature of the invention, the machine 11 comprises two relatively short, parallel, straight or slightly arcuate auxiliary rails 66, 67 which are mounted on a forward extension 72 of the headstock 28 (see FIGS. 1 or 2). The purpose of the auxiliary rails 66, 67 is to enter between the end portions 51, 52 of the respective guide rails 36, 37 in the open position of the magazine 12 and to thus complete the lateral boundaries for the corresponding portions of the path 38. This enables the indexing means including the motor 44 and the sprocket wheel 43 to advance the supply of spare tools by a step so that the tool 14A assumes the position which was previously occupied by the tool 14L or 14R while the tool 14R or 14L is moved into register with the spindle 13 which is then retracted to an upper end position so that it does not interfere with advancement of tools 14 along the path 38. When the auxiliary rails 66, 67 are properly installed in the magazine 12, their end portions 68, 69 are immediately or closely adjacent to the end portions 51, 52 of the respective guide rails 36, 37. This can be seen in FIG. 4.

The auxiliary rails 66, 67 are mounted at the lower end of a shaft 71 which is reciprocable in the forward extension 72 of the headstock 28. The shaft 71 is movable in one of the two directions (namely, up or down) by one or more prestressed springs which are not specifically shown in the drawing. Such spring or springs tend to bias the auxiliary rails 66, 67 to positions in which such rails are located in the common plane of the guide rails 36, 37, i.e., in which the auxiliary rails 66, 67 close the gaps which are provided in the respective guide rails 36, 37 by the opening mechanism 53 when such mechanism is held in the operative position of FIG. 4. The tool 14A which is shown in FIG. 4 is then supported by the auxiliary rails 66, 67.

The mode of operation of the system which transfers tools 14 between the spindle 13 and the magazine 12 is as follows:

When the magazine 12 is shut (as shown in FIG. 3), the spindle 13 can be moved in the direction or directions which are indicated by the arrow X, Y and/or Z in order to treat a workpiece which is clamped to the supporting table 17 on the frame 16. At such time, the motor 44 can be started to index the sprocket wheel 43 until a selected tool 14L or 14R is immediately adjacent to the vertical plane 46 as shown in FIG. 3. The motor 44 can be started and arrested by a suitable programming unit and the magazine 12 can contain or can be combined with suitable monitoring means which detects the arrival of a selected tool 14L or 14R at the transfer station. In the embodiment which is shown in the drawing, the motor 29 can move the headstock 28 between the upper end position which is shown in FIG. 1 by solid lines and a lower end position which is shown in FIG. 1 by phantom lines. Also, the motor 23 for the carriage 22 can move the supporting device 24 and the headstock 28 between the position which is shown by solid lines and the position which is shown by phantom lines. It is clear that longer or shorter vertical and/or horizontal strokes can be selected if necessary. The auxiliary rails 66, 67 share the movements of the headstock 28 in the directions which are indicated by the arrow Z. The position of the magazine 12 is changed only when the motor (not shown) for the carriage 19 is started to move this carriage along the ways 18, i.e., at right angles to the plane of FIG. 1.

When the tool 14A is to be transferred from the lower end portion of the spindle 13 into the magazine 12, the motor 29 is caused to move the headstock 28 and the spindle 13 to the solid-line positions of FIG. 1 so that the auxiliary rails 66, 67 are located in the common plane of the guide rails 36, 37. Furthermore, the supporting device 24 is moved (by the motor 23) in a direction to the right, as viewed in FIG. 1, so that the opening mechanism 53 causes its cam 62 to move from the position of FIG. 3 to the position of FIG. 4 with the result that the parts 36A, 37A of the guide rails 36, 37 store energy and the end portions 51, 52 of each of the rails 36, 37 are moved apart in order to establish the passage P. The movement of the supporting device 24 in a direction to advance the cam 62 from the retracted position of FIG. 3 to the operative position of FIG. 4 can take place, at least in part, simultaneously with movement of the headstock 28 to the position in which the auxiliary rails 66, 67 are coplanar with the rails 36, 37 of the magazine 12. The movement of the headstock 28 (under the action of the motor 29) to the solid-line position of FIG. 1 should be terminated at the time when the spindle 13 and its axis 47 assume the positions which are shown in FIG. 3, i.e., immediately adjacent to the openable portions of the guide rails 36 and 37. Further movement of the supporting device 24 in the direction to the right, as viewed in FIG. 3, entails an opening of the magazine 12 under the action of the cam 62 and the opening action of this cam should be sufficient to ensure that the front auxiliary rail 66 does not strike against the end portions 51, 52 of the outer guide rail 37 at the time when such end portions are in the process of moving apart and establishing one part of the passage P. It will be noted that opening of the magazine 12 takes place in automatic response to movement of the supporting device 24 in one of the directions which are indicated by the arrow Y. This is advantageous and desirable because it is not necessary to provide a separate drive for the cam 62 and to synchronize the operation of such drive with that of the motor 23 for the supporting device 24. The manner in which the shaft 62a of the cam 62 can be secured to the supporting device 24 or to its carriage 22 is not specifically shown in the drawing. The distance between the headstock 28 and the cam 62 can be selected practically at will. As mentioned before, the spring or springs for the shaft 71 ensure that the auxiliary rails 66, 67 are maintained in the plane of the guide rails 36, 37 while the magazine 12 is held in the open position of FIG. 4. When the tool 14A assumes the position of FIG. 4, the motor 29 is started to move the headstock 28 and the spindle 13 upwardly and to thus separate the spindle from the tool 14A which remains between the auxiliary rails 66, 67 and is thus transferred into the magazine 12, and more particularly into that portion of the temporarily lengthened oval path 38 which is disposed in the region of the passage P. At such time, the aforementioned spring or springs retain the shaft 71 and the auxiliary rails 66, 67 in the positions of FIG. 4, namely in the common plane of the guide rails 36 and 37. In other words, the extension 72 and the headstock 28 move with the spindle 13 under the action of the motor 29, but such movement is not shared by the auxiliary rails 66 and 67. This ensures that the tool 14A is held in proper position for transport along the path 38 as soon as the sprocket wheel 43 is indexed to cause the tool 14L or 14R to swap positions with the tool 14A. At such time, the auxiliary rail 66 and/or 67 can abut against a suitable stop which cooperates with the spring or springs in the extension 72 to maintain the auxiliary rails 66, 67 at the level of the guide rails 36, 37. Relative movement between the extension 72 and shaft 71 for the auxiliary rails 66, 67 can cause the spring or springs in the extension 72 to store energy.

When the spindle 13 is lifted to its upper end position or to a position at a level which is sufficiently high to ensure that the spindle is completely separated from the tool 14A and cannot interfere with the transfer of such tool into the adjacent portion of the path 38, the sprocket wheel 43 is indexed by the motor 44 for the aforeexplained reason, i.e., to cause the tool 14L or 14R to swap positions with the tool 14A whereby the tool 14A is transferred deeper into the magazine 12 and the tool 14L or 14R is located in the path of downward movement of the spindle 13. Such downward movement of the spindle 13 takes place as soon as the tool 14L or 14R has traded positions with the tool 14A of FIG. 4 whereby the tool 14L or 14R is automatically coupled to the spindle 13. The downward movement of the spindle 13 beyond the position which is necessary to complete the connection between such spindle and the tool 14L or 14R results in downward movement of the auxiliary rails 66, 67 below the plane of the guide rails 36, 37. The motor 23 is then started to move the carriage 22 in a direction to the left, as viewed in FIG. 1, whereby the cam 62 shares such movement and the mechanism 53 allows the elastomeric portions 36A, 37A of the guide rails 36, 37 to narrow the passage P or to reduce the width of such passage to zero. This completes the shutting of the magazine 12 and the freshly removed tool 14L or 14R is thereupon advanced toward engagement with the workpiece on the supporting table 17.

In the next step, the motor 44 can index the sprocket wheel 43 again until a selected tool, which should be attached to the spindle 13 during the next transfer operation, is moved to the position which is occupied in FIG. 3 by the tool 14L or 14R. The magazine 12 is then ready for the next transferring operation which is started as soon as the tool 14 which is attached to the lower end portion of the spindle 13 requires replacement. It will be noted that, due to the provision of the auxiliary rails 66, 67 and the placing of such rails into the plane of the guide rails 36, 37 when the transfer of a tool is to take place, the indexing of tools along the path 38 can also take place in the open position of the magazine 12.

The improved machine is susceptible of many additional modifications without departing from the spirit of the invention. For example, and as already mentioned above, the magazine 12 can be dimensioned and/or configurated in a number of different ways, depending on the dimensions of the tools which are stored therein as well as on the number of such tools and the dimensions of the space which is available in the machine to accommodate the magazine. Furthermore, it is clear that the machine can be modified by causing the magazine 12 or an analogous magazine to open in response to movement of the supporting device 24 in one of the directions which are indicated by the arrow X. Still further, and as also mentioned above, it is not necessary that the two halves of each of the guide rails 36, 37 perform symmetrical or identical movements in response to movement of the cam 62 to the operative position of FIG. 4. If the cam 62 is asymmetric, one half of each of the guide rails 36, 37 will remain stationary or will move to a lesser extent than the other half. Still further, it is possible to open the magazine 12 by moving it relative to the supporting device 24. This would merely amount to a reversal of functions but would not basically change the mode of operation of the tool storing and transferring means. The illustrated construction is preferred at this time because it is customary to mount the supporting device 24 for movement in the directions which are indicated by the double-headed arrow Y.

It is further possible to replace the elastically deformable parts 36A, 37A of the guide rails 36, 37 with sections which are articulately connected to each other so that they invariably follow the movements of the spreading bars 56, 57. In such magazines, the spreading bars 56, 57 are provided or acted upon by suitable springs which continuously urge the respective roller followers 59 against the reciprocable opening cam 62.

An important advantage of the improved machine is that the transfer of tools between the spindle 13 and the magazine 12 takes up a short interval of time. This is due to the fact that a selected tool can be placed into immediate proximity of the locus of transfer while the previously transferred tool is in actual use in connection with the treatment of workpieces.

Another advantage of the improved machine is that the magazine 12 can be placed at a substantial or at a desired safe distance from the location of treatment of workpieces on the table 17. This reduces the likelihood of contamination of spare tools which are stored in the magazine.

A further advantage of the improved machine is that the mechanism for transferring tools between the spindle 13 and the magazine 12 is very simple, compact and inexpensive. This is due to the absence of the aforediscussed manipulator which is used in certain conventional tool storing and transferring mechanisms. The transfer takes place in automatic response to lifting and lowering of the tool spindle 13 relative to the magazine 12. The distances through which the spindle 13 must be moved in order to become disengaged from a previously used tool or to become coupled to the next tool are short. Furthermore, such movements can be effected by the prime mover (motor 29) which is provided anyway because it must move the headstock 28 and the spindle 13 with reference to the supporting device 24.

An additional important advantage of the improved machine is that the opening of the magazine 12 can be effected without resorting to a specially designed or specially constructed prime mover. Thus, the prime mover 23 which is used to reciprocate the carriage 22 along the ways 21 can also serve to impart motion to the cam 62 of the opening or spreading mechanism 53 for the magazine 12.

Still another advantage of the improved machine is attributable to the specific design of the improved magazine 12. Thus, a selected tool (such as the tool 14L or 14R of FIG. 3) can be moved to an optimum position for immediate transfer onto the spindle 13 while the tool 14A on the spindle 13 is in actual use for treatment of a workpiece on the table 17.

It is further clear that, if the cam 62 is asymmetric, it is not always necessary to provide two spreading bars 56, 57. In such magazines, a single spreading bar 56 or 57 will suffice to effect an opening of the magazine in response to movement of the cam to its operative position corresponding to the position of the cam 62 shown in FIG. 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A machine for removal of material from workpieces by any one of a plurality of tools, comprising a frame; a supporting device on said frame; a tool holding mounted on said supporting device; an open-and-shut tool storing device on said frame, at least one of said devices being movable to a predetermined position with reference to the other of said devices preparatory to tool transfer between said spindle and said storing device, and said storing device being movable between a shut position in which said storing device has a first storage capacity, and an open position in which said storing device has a greater second storage capacity and defines a transfer location for the transfer of tools between said spindle and said storing device, said storing device being capable of assuming said open position on movement of said one device to said predetermined position; and means for moving said one device to and from said predetermined position, and for effecting relative movement of said spindle and said storing device on movement of said one device to said predetermined position to thereby effect actual transfer to tools between said spindle and said storing device at said transfer location.

2. The machine of claim 1, wherein said one device is said supporting device.

3. The machine of claim 2, wherein said supporting device is movable to and from said predetermined position along a preselected direction and said storing device is fixed against movement along said preselected direction.

4. The machine of claim 2, comprising means for opening said storing device in response to movement of said supporting device toward said predetermined position.

5. The machine of claim 4, wherein said opening means is connected with and shares the movements of said supporting device with reference to said storing device.

6. The machine of claim 5, wherein said opening means comprises cam means which is reciprocable by said supporting device in first and second directions and follower means engageable by said cam means while the latter moves in one of said directions to thereby open said storing device.

7. The machine of claim 6, wherein said spindle is movable with reference to said supporting device in a direction at right angles to the directions of reciprocatory movement of said cam means.

8. The machine of claim 1, comprising a first carriage for moving said supporting device relative to said frame in a first direction, a second carriage provided on said first carriage and arranged to move said supporting device in a second direction at right angles to said first direction, and means guiding said spindle for movement relative to said supporting device in a third direction at right angles to said first and second directions.

9. The machine of claim 1, comprising a table on said frame for holding a workpiece; and wherein said one device is movable to another position with reference to said other device, said spindle and said storing device being adjacent to one another when said one device is in said predetermined position, and said spindle confronting said table for workpiece processing and being remote from said storing device when said one device is in said other position.

10. The machine of claim 1, wherein said storing device has a section which faces said spindle and includes relatively movable first and second portions, said portions being located nearer one another in said shut position to inhibit tool transfer into and out of said storing device, and said portions being located farther from one another in said open position to allow for tool transfer into and out of said storing device.

11. The machine of claim 1, wherein said moving and effecting means comprises frist drive means for moving said one device to and from said predetermined position, and second drive means for effecting relative movement of said spindle and said storing device on movement of said one device to said predetermined position.

12. A machine for removal of material from workpieces by any one of a plarality of tools, comprising a frame; a supporting device on said frame; a tool spindle mounted on said supporting device; an open-and-shut tool storing device on said frame, said storing device being openable to allow for transfer of tools between said spindle and said storing device on movement of at least one of said devices to a predetermined position with reference to the other of said devices, and said storing device comprising guide means defining an elongated path for a supply of tools, and means for advancig the tools of said supply along said path, said guide means including portions which are adjacent to each other in the shut position of said storing device and are spaced apart from one another in the open position of said storing device to provide a passage between the end postions of said guide means; and means for moving said one device to and from said predetermined position.

13. The machine of claim 12, wherein said path is an endless path in the shut position of said storing device.

14. The machine of claim 12, wherein at least a part of said guide means consists of elastomeric material and tends to move said portions of said guide means toward each other so as to reduce the width of said passage.

15. The machine of claim 12, wherein said guide means comprises spaced parallel first and second guide rails each having a first and a second end portion, said end portions of each guide rail being closely adjacent to each other in the shut position of said storing device and being spaced apart to establish said passage in the open position of said storing device.

16. The machine of claim 15, wherein said supporting device includes first and second auxiliary rails which enter between the end portions of the respective guide rails in said predetermined position of said one device.

17. The machine of claim 16, wherein said supporting device comprises a headstock for said tool spindle and said headstock has an extension for said auxiliary rails.

18. The machine of claim 17, comprising means for moving said headstock relative to said storing device so as to move said auxiliary rails into or from said passage.

19. The machine of claim 18, wherein said headstock is movable along a vertical path and the elongated path which is defined by said guide means is a horizontal path.

20. The machine of claim 19, wherein said spindle is in a position to receive a tool from said elongated path or to allow for transfer of a tool therefrom into said elongated path only when said auxiliary rails are disposed between said portions of the respective guide rails.

* * * * *